(12) United States Patent
Trapani et al.

(10) Patent No.: US 11,416,369 B1
(45) Date of Patent: Aug. 16, 2022

(54) MACHINE LEARNING MODELS FOR AUTOMATED ANOMALY DETECTION FOR APPLICATION INFRASTRUCTURE COMPONENTS

(71) Applicant: Express Scripts Strategic Development, Inc., St. Louis, MO (US)

(72) Inventors: Michael D. Trapani, Rochester, NY (US); Jeevan Kumar Goud Bandharapu, Lodi, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 55 days.

(21) Appl. No.: 17/126,250

(22) Filed: Dec. 18, 2020

(51) Int. Cl.
| | |
|---|---|
| *G06F 11/34* | (2006.01) |
| *G06N 20/00* | (2019.01) |
| *G06F 11/30* | (2006.01) |
| *H04L 43/08* | (2022.01) |
| *G06F 17/18* | (2006.01) |

(52) U.S. Cl.
CPC ...... *G06F 11/3409* (2013.01); *G06F 11/3055* (2013.01); *G06F 17/18* (2013.01); *G06N 20/00* (2019.01); *H04L 43/08* (2013.01)

(58) Field of Classification Search
CPC .. G06F 11/3409; G06F 11/3055; G06F 17/18; G06N 20/00; H04L 43/08
See application file for complete search history.

(56) References Cited

U.S. PATENT DOCUMENTS

| | | | |
|---|---|---|---|
| 10,193,741 B2 | 1/2019 | Zafer | |
| 10,200,267 B2 | 2/2019 | Zafer | |
| 10,635,565 B2 | 4/2020 | Dang | |
| 10,917,419 B2 | 2/2021 | Crotinger | |
| 11,277,420 B2 * | 3/2022 | Côté | H04L 63/1425 |
| 2007/0266149 A1 * | 11/2007 | Cobb | H04L 41/5083 709/224 |
| 2013/0282710 A1 * | 10/2013 | Raghavan | G06F 16/838 707/728 |
| 2017/0017760 A1 | 1/2017 | Freese | |
| 2019/0042981 A1 * | 2/2019 | Bendfeldt | G06F 9/451 |

(Continued)

*Primary Examiner* — Arvin Eskandarnia
*Assistant Examiner* — Chhian (Amy) Ling
(74) *Attorney, Agent, or Firm* — Miller Johnson

(57) ABSTRACT

A computer system includes processor hardware configured to execute instructions from memory hardware. The instructions include training first and second machine learning models with the measured historical performance metrics to generate a component health status output and a component health score output, respectively, and generating a plurality of elements for display in a multi-level application monitoring interface. The measured historical performance metrics include at least one of a component response time, a component volume, a component memory utilization, and a component processor utilization. The instructions include obtaining measured performance metrics of an application infrastructure component, processing the measured performance metrics with the first machine learning model to produce the component health status output for the component, processing the measured performance metrics with the second machine learning model to produce the component health score output for the first component, and generating an output to transform a display visible to an operator.

18 Claims, 12 Drawing Sheets

(56) References Cited

U.S. PATENT DOCUMENTS

| | | |
|---|---|---|
| 2019/0044825 A1 | 2/2019 | Vijayakumar |
| 2019/0260794 A1 | 8/2019 | Woodford |
| 2019/0394283 A1 | 12/2019 | Morrison |
| 2020/0174867 A1 | 6/2020 | Mo |
| 2020/0387833 A1 | 12/2020 | Kursun |
| 2021/0360077 A1* | 11/2021 | Bandari ................. H04L 67/22 |

* cited by examiner

| Component Statuses and Scores -- Resource Center Component 1 |||||||
|---|---|---|---|---|---|---|
| Time | Error | Host | Volume | Boundary Ranges Volume | Z Score Volume | Probability Density Volume |
| 20XX-03-09 4:45:00 PM | responseTime | psu12345 | 1 | [5.4281,Infinity, 0.0001] | 0 | 2.900799 |
| Response Time | Boundary Ranges Response Time | Z Score Response Time | Probability Density Response Time | Health Status | Health Score | |
| 3.5 | [1.4128,Infinity, 0.0001] | 10 | 0.000608 | WARNING | 40 | |

| Time | log_JSP_Request | Orig_Host | Volume | Response Time | Boundary Ranges Volume | IsOutlier | Probability Density | Request Type |
|---|---|---|---|---|---|---|---|---|
| 20XX-06-23 00:00:00 | /Account/abc_sum.jsp | psu12345 | 1 | 0.519367 | [5.6966,Infinity, 0.0001] | 0 | 0.7333 | Account |
| 20XX-06-23 00:00:00 | /Account/getData.jsp | psu67890 | 1 | 0.100791 | [5.6966,Infinity, 0.0001] | 0 | 1.4799 | Account |
| 20XX-06-23 00:00:00 | /Account/abc_sum.jsp | abc12345 | 4 | 1.010667 | [5.6966,Infinity, 0.0001] | 0 | 0.3301 | Account |
| 20XX-06-23 00:10:00 | /Alternate/List.jsp | psu12345 | 1 | 0.572439 | [4.1264,5.08190, 0.0001] | 0 | 0.6727 | Alternate Search |
| 20XX-06-23 00:10:00 | /Summary/abc_sum.jsp | abc67890 | 1 | 0.579062 | [5.6966,Infinity, 0.0001] | 0 | 0.6655 | Summary |
| 20XX-06-23 00:10:00 | /Account/getData.jsp | psu12345 | 1 | 0.170641 | [5.6966,Infinity, 0.0001] | 0 | 1.2924 | Account |
| 20XX-06-23 00:10:00 | /Account/abc_sum.jsp | abc67890 | 3 | 1.719751 | [4.1264,5.08190, 0.0001] | 1 | 0.3821 | Account |
| 20XX-06-23 00:15:00 | /Alternate/List.jsp | def24680 | 1 | 0.168345 | [5.6966,Infinity, 0.0001] | 0 | 1.3033 | Alternate Search |
| 20XX-06-23 00:15:00 | /Account/abc_sum.jsp | hij13579 | 2 | 1.401812 | [5.6966,Infinity, 0.0001] | 1 | 1.2971 | Account |

MACHINE LEARNING MODELS FOR AUTOMATED ANOMALY DETECTION FOR APPLICATION INFRASTRUCTURE COMPONENTS

FIELD

The present disclosure relates to machine learning models for automated anomaly detection for application infrastructure components.

BACKGROUND

Application infrastructure components often experience degradations in performance over time, and it may be desirable to replace the components prior to total failure of the components. Various performance metrics of the components may be monitored, including a response time of the components, a volume of the components, a memory utilization of the components, and a CPU utilization of the components.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system for automated detection of anomalous performance of application infrastructure components includes memory hardware configured to store a first machine learning model, a second machine learning model, measured historical performance metrics, and computer-executable instructions. The measured historical performance metrics include at least one of a component response time, a component volume, a component memory utilization, and a component processor utilization. The system includes processor hardware configured to execute the instructions. The instructions include training the first machine learning model with the measured historical performance metrics to generate a component health status output, training the second machine learning model with the measured historical performance metrics to generate a component health score output, and generating a plurality of elements for display in a multi-level application monitoring interface. Each element of the plurality of elements corresponds to one of a plurality of application infrastructure components and includes a status indicator. The instructions include obtaining measured performance metrics of a first component of the plurality of application infrastructure components during a reporting window time period, identifying a time period segment associated with the reporting window time period, obtaining an outlier threshold value corresponding to the identified time period segment, processing the measured performance metrics with the first machine learning model, using the obtained outlier threshold value, to produce the component health status output for the first component, and in response to the component health status output for the first component being a normal status indicative of normal operation of the first component, setting the status indicator of the element corresponding to the first component to a normal value. The instructions include, in response to the component health status output for the first component being an abnormal status indicative of abnormal operation of the first component, modifying the status indicator of the element corresponding to the first component to a warning value. The instructions include processing the measured performance metrics with the second machine learning model, using the obtained outlier threshold value, to produce the component health score output for the first component, and generating an output to transform a display visible to an operator. The output incorporates the component health score output and the status indicator for the first component on the element corresponding to the first component.

In other features, the instructions further include, in response to the component health status output for the first component being the abnormal status, automatically modifying the abnormal operation of the first component. In other features, the instructions further include, in response to the component health status output for the first component being the abnormal status, automatically generating a ticket request to modify the abnormal operation of the first component.

In other features, the multi-level application monitoring interface includes four display panel levels, and the plurality of elements includes a plurality of application elements, a plurality of component type elements, a plurality of component group elements, and a plurality of component elements. A first one of the four display panel levels includes the plurality of application elements, and each one of the plurality of application elements corresponds to a different application. A second one of the four display panel levels includes the plurality of component type elements, and each one of the plurality of component type elements corresponds to a different component type. A third one of the four display panel levels includes the plurality of component group elements, and each one of the plurality of component group elements corresponds to a different component group. A fourth one of the four display panel levels includes the plurality of component elements, and each one of the plurality of component elements corresponds to a different one of the plurality of application infrastructure components.

In other features, the transforming the display includes displaying the first one of the display panel levels, and the instructions further include displaying the second display panel level in response to receiving a user selection of one of the plurality of application elements. Each of the plurality of component type elements displayed on the second display panel level are descendant component type elements of the selected application element. Transforming the display includes displaying the third display panel level in response to receiving a user selection of one of the displayed plurality of component type elements. Each of the plurality of component group elements displayed on the third display panel level are descendant component group elements of the selected component type element. Transforming the display includes displaying the fourth display panel level in response to receiving a user selection of one of the displayed plurality of component group elements. Each of the plurality of component elements displayed on the fourth display panel level are descendant component elements of the selected component group element. Transforming the display includes displaying a component data structure in response to receiving a user selection of one of the displayed plurality of component elements. The component data structure includes measured performance metrics of the selected component element.

In other features, the instructions further include for each component group element, calculating an average of component health score outputs for each descendant component element of the component group element and displaying the calculated average in the component group element. The instructions include, for each component type element, calculating an average of component health score outputs for each descendant component group element of the component type element and displaying the calculated average in the component type element. The instructions include, for each application element, calculating an average of component health score outputs for each descendant component type element of the application element and displaying the calculated average in the application element.

In other features, the instructions further include, for each component group element, in response to any descendant component element of the component group element having a warning status indicator, setting a status indicator of the component group element to the warning value. The instructions include, for each component type element, in response to any descendant component group element of the component type element having a warning status indicator, setting a status indicator of the component type element to the warning value. The instructions include, for each application element, in response to any descendant component type element of the application element having a warning status indicator, setting a status indicator of the application element to the warning value.

In other features, the first machine learning model comprises a density function machine learning model, and the second machine learning model comprises a random forest regressor machine learning model. In other features, the instructions further include, after the obtaining measured performance metrics, summarizing the measured performance metrics to generate plurality of percentiles of the measured performance metrics, a standard deviation of the measured performance metrics, a variance of the measured performance metrics, a minimum of the measured performance metrics, a maximum of the measured performance metrics, an average of the measured performance metrics, a response time of the measured performance metrics, and a volume of the measured performance metrics.

In other features, the instructions further include displaying a historical event dashboard on the multi-level application monitoring interface. The historical event dashboard displays warning values generated for the plurality of application infrastructure components during a specified historical time period, and the displayed warning values are sorted by at least one of a time that each warning value was generated and a component that generated each warning value.

A computerized method for automated detection of anomalous performance of application infrastructure components includes training a first machine learning model with measured historical performance metrics to generate a component health status output. The measured historical performance metrics include at least one of a component response time, a component volume, a component memory utilization, and a component processor utilization. The method includes training a second machine learning model with the measured historical performance metrics to generate a component health score output, and generating a plurality of elements for display in a multi-level application monitoring interface. Each element of the plurality of elements corresponds to one of a plurality of application infrastructure components and includes a status indicator. The method includes obtaining measured performance metrics of a first component of the plurality of application infrastructure components during a reporting window time period, identifying a time period segment associated with the reporting window time period, obtaining an outlier threshold value corresponding to the identified time period segment, processing the measured performance metrics with the first machine learning model, using the obtained outlier threshold value, to produce the component health status output for the first component, and in response to the component health status output for the first component being a normal status indicative of normal operation of the first component, setting the status indicator of the element corresponding to the first component to a normal value. The method includes, in response to the component health status output for the first component being an abnormal status indicative of abnormal operation of the first component, modifying the status indicator of the element corresponding to the first component to a warning value. The method includes processing the measured performance metrics with the second machine learning model, using the obtained outlier threshold value, to produce the component health score output for the first component, and generating an output to transform a display visible to an operator. The output incorporates the component health score output and the status indicator for the first component on the element corresponding to the first component.

In other features, the method includes, in response to the component health status output for the first component being the abnormal status, automatically modifying the abnormal operation of the first component. In other features, the method includes, in response to the component health status output for the first component being the abnormal status, automatically generating a ticket request to modify the abnormal operation of the first component.

In other features, the multi-level application monitoring interface includes four display panel levels, and the plurality of elements includes a plurality of application elements, a plurality of component type elements, a plurality of component group elements, and a plurality of component elements. A first one of the four display panel levels includes the plurality of application elements, and each one of the plurality of application elements corresponds to a different application. A second one of the four display panel levels includes the plurality of component type elements, and each one of the plurality of component type elements corresponds to a different component type. A third one of the four display panel levels includes the plurality of component group elements, and each one of the plurality of component group elements corresponds to a different component group. A fourth one of the four display panel levels includes the plurality of component elements, and each one of the plurality of component elements corresponds to a different one of the plurality of application infrastructure components.

In other features, the transforming the display includes displaying the first one of the display panel levels, and the method further includes displaying the second display panel level in response to receiving a user selection of one of the plurality of application elements. Each of the plurality of component type elements displayed on the second display panel level are descendant component type elements of the selected application element. Transforming the display includes displaying the third display panel level in response to receiving a user selection of one of the displayed plurality of component type elements. Each of the plurality of component group elements displayed on the third display panel level are descendant component group elements of the selected component type element. Transforming the display includes displaying the fourth display panel level in response to receiving a user selection of one of the displayed plurality of component group elements. Each of the plurality of component elements displayed on the fourth display panel level are descendant component elements of the selected component group element. Transforming the display includes displaying a component data structure in response to receiving a user selection of one of the displayed plurality of component elements. The component data structure includes measured performance metrics of the selected component element.

In other features, the method includes, for each component group element, calculating an average of component health score outputs for each descendant component element of the component group element and displaying the calculated average in the component group element. The method includes, for each component type element, calculating an average of component health score outputs for each descendant component group element of the component type element and displaying the calculated average in the component type element. The method includes, for each application element, calculating an average of component health score outputs for each descendant component type element of the application element and displaying the calculated average in the application element.

In other features, the method includes, for each component group element, in response to any descendant component element of the component group element having a warning status indicator, setting a status indicator of the component group element to the warning value. The method includes, for each component type element, in response to any descendant component group element of the component type element having a warning status indicator, setting a status indicator of the component type element to the warning value. The method includes, for each application element, in response to any descendant component type element of the application element having a warning status indicator, setting a status indicator of the application element to the warning value.

In other features, the first machine learning model comprises a density function machine learning model, and the second machine learning model comprises a random forest regressor machine learning model. In other features, the method includes, after the obtaining measured performance metrics, summarizing the measured performance metrics to generate plurality of percentiles of the measured performance metrics, a standard deviation of the measured performance metrics, a variance of the measured performance metrics, a minimum of the measured performance metrics, a maximum of the measured performance metrics, an average of the measured performance metrics, a response time of the measured performance metrics, and a volume of the measured performance metrics.

In other features, the method includes displaying a historical event dashboard on the multi-level application monitoring interface. The historical event dashboard displays warning values generated for the plurality of application infrastructure components during a specified historical time period, and the displayed warning values are sorted by at least one of a time that each warning value was generated and a component that generated each warning value.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 9 is a table illustrating example anomaly detection values of computer system component as calculated by machine learning models.

In the drawings, reference numbers may be reused to identify similar and/or identical elements.

DETAILED DESCRIPTION

High-Volume Pharmacy

Figure 1:
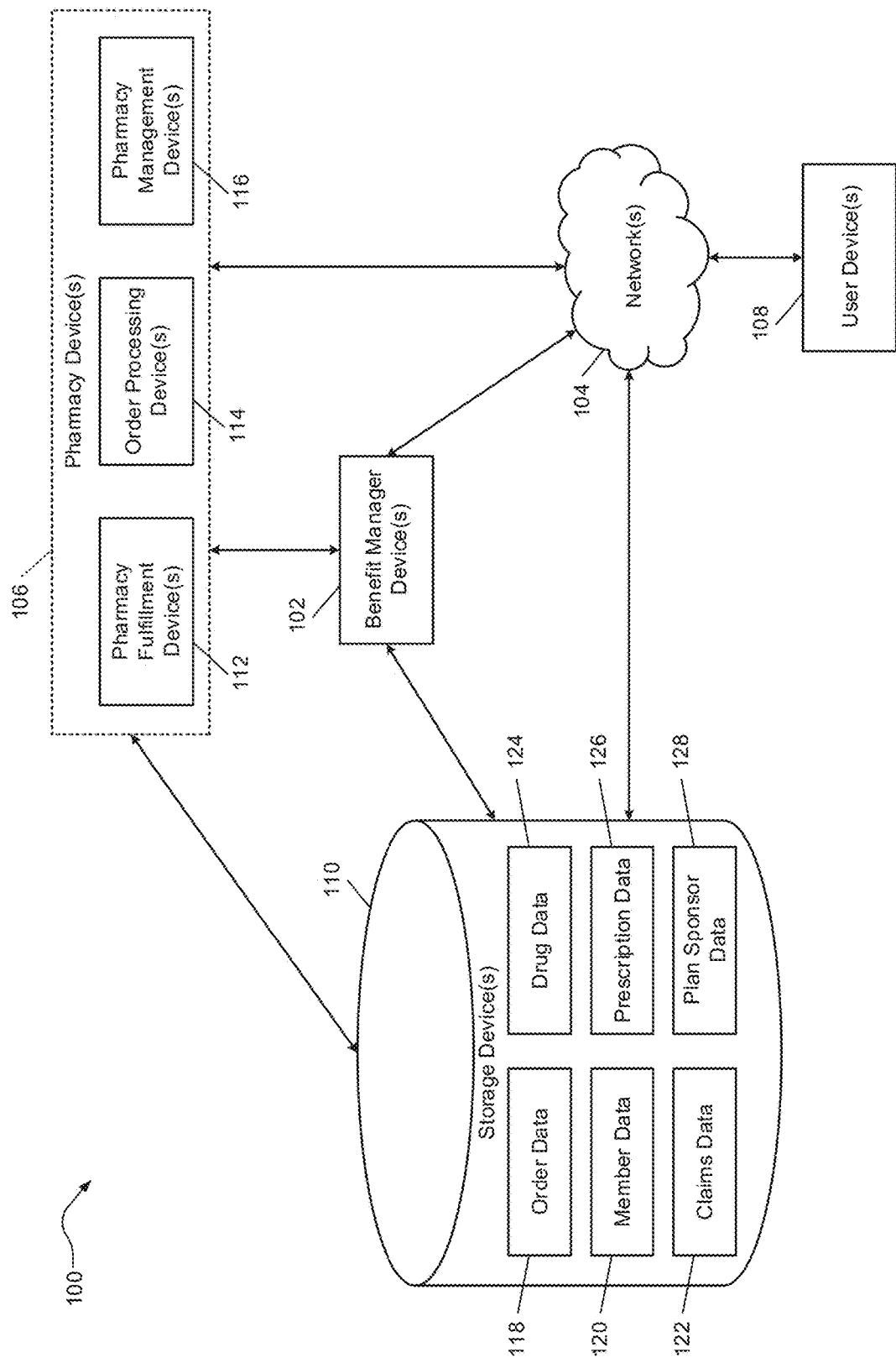
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
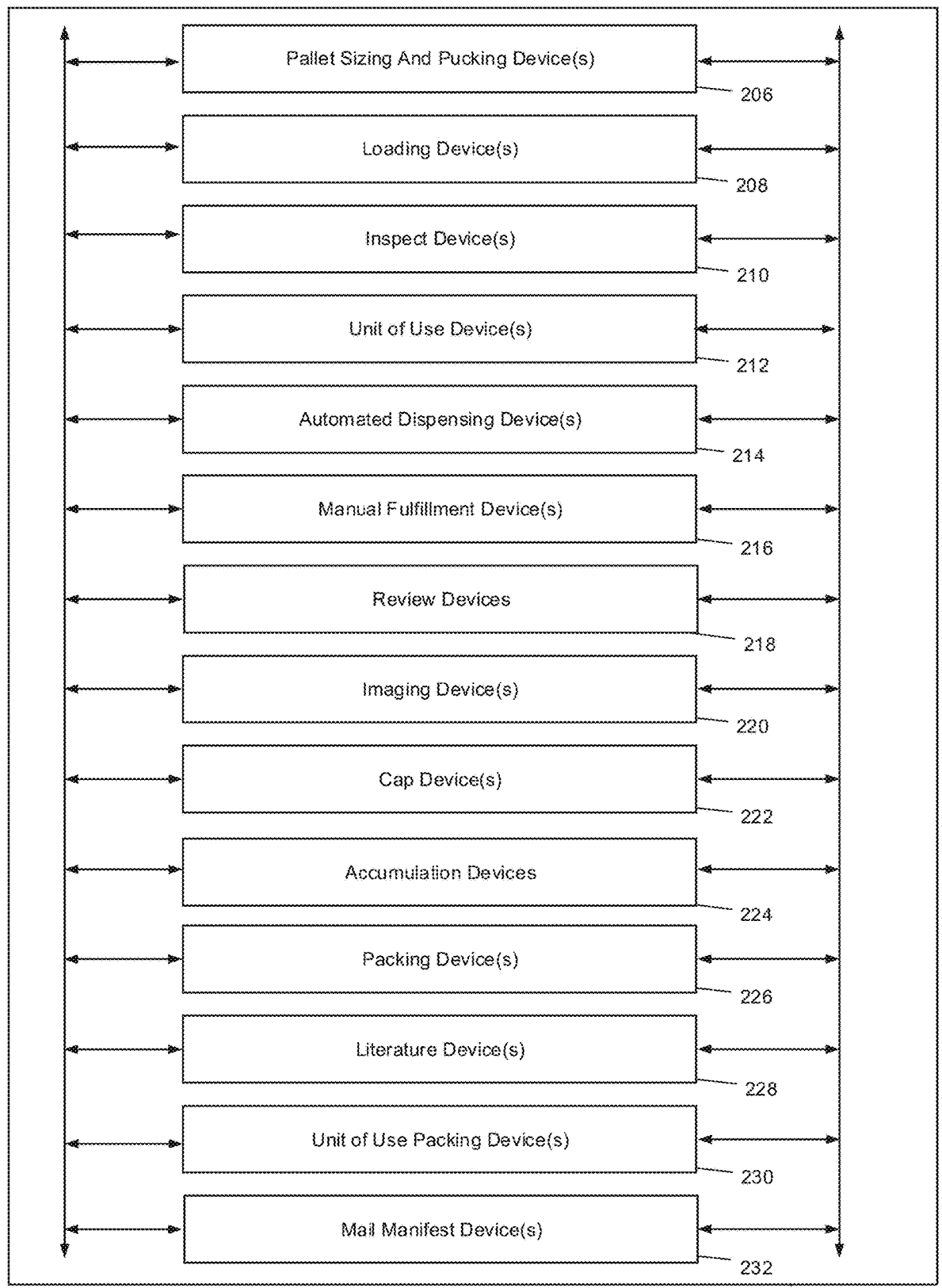
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
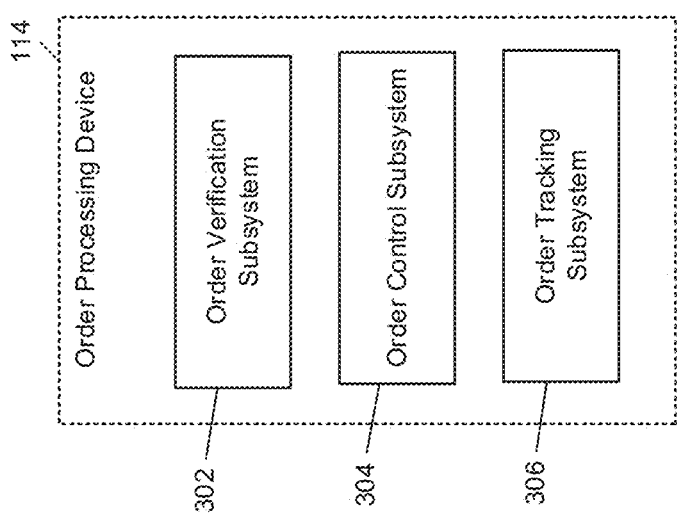
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Computer System for Anomaly Detection

In various implementations, machine learning models are used to predict future computer system failures, in order to automatically fix system components or to generate a correction request before the problem manifests. Self-healing and predictive analytics may use reliable machine learning models and significant historical data. The machine learning models may be used to determine health of application infrastructure components, and may reduce mean-time-to-resolution (MTTR) by reducing time-to-awareness and time-to-isolation.

In various implementations, a single-pane-of-glass dashboard may be used that allows high-level monitoring of system components, as well as drill-down into health statuses and associated parameters of individual components. As described further herein, a four level monitoring view of the dashboard starts at an application summary level. If there is an issue with any component of the system that belong to an application, the dashboard will indicate the application issue the first level. The end-user of the dashboard can click on an application tile element on the user interface, and the next level of monitoring for the selected application will appear (for example, a second level having multiple component type tile elements).

The user can then see which application component type has a problem (for example, which component types have component(s) with a warning health status as determined by a machine learning model), and the user can click on a component type tile element to drill-down to the next level. For example, the third level may illustrate different component groups that belong to the selected component type, and a fourth level may illustrate actual components (including the component that actually generated the health status warning). The component and host that generated the warning could then be automatically fixed (for example, by automatically shutting down a component, restarting the component, starting a new instance of the component, or any suitable self-healing implementation), or the system could generate a request for an incident team to investigate the component and host to address the issue.

Each component in the application infrastructure (such as web servers, firewalls, intrusion detection systems, application servers, file storage or SQL servers, etc.), may have two key performance indicators (KPIs), a health status and a health score. The health status KPI has two discrete values, a normal health status and a warning health status. The normal and warning health statuses may be color coded on the tile elements of the user interface for easy recognition by a system administrator, such as a green color for a normal health status and a yellow or orange color for a warning health status. In other implementations, more or less KPIs may be used for each component, and each KPI may have more than two discrete values.

In various implementations, the health status may be used to determine whether the health of the application or application component is consistent with its historical behavior over a recent time period, such as the last thirty days. The health score KPI may be a continuous value, such as a range from 0-100, where 100 is the best score. The health score may use up to fifteen input variables or more to generate a rating of the overall health of the application component.

A component having a warning health status and a low health score may indicate a likely problem area that should be fixed or investigated. A component may have a warning health status with a good health score, which may indicate a non-normal trend that a system administrator may want to monitor over a period of time to see if the non-normal trend continues. A component with a low health score but a normal health status may also require additional monitoring to determine the extent of the degraded health of the component. Some older technologies may have lower health scores much of the time, and may require intervention by problem management teams to retrofit and modernize the older components.

Figure 4:
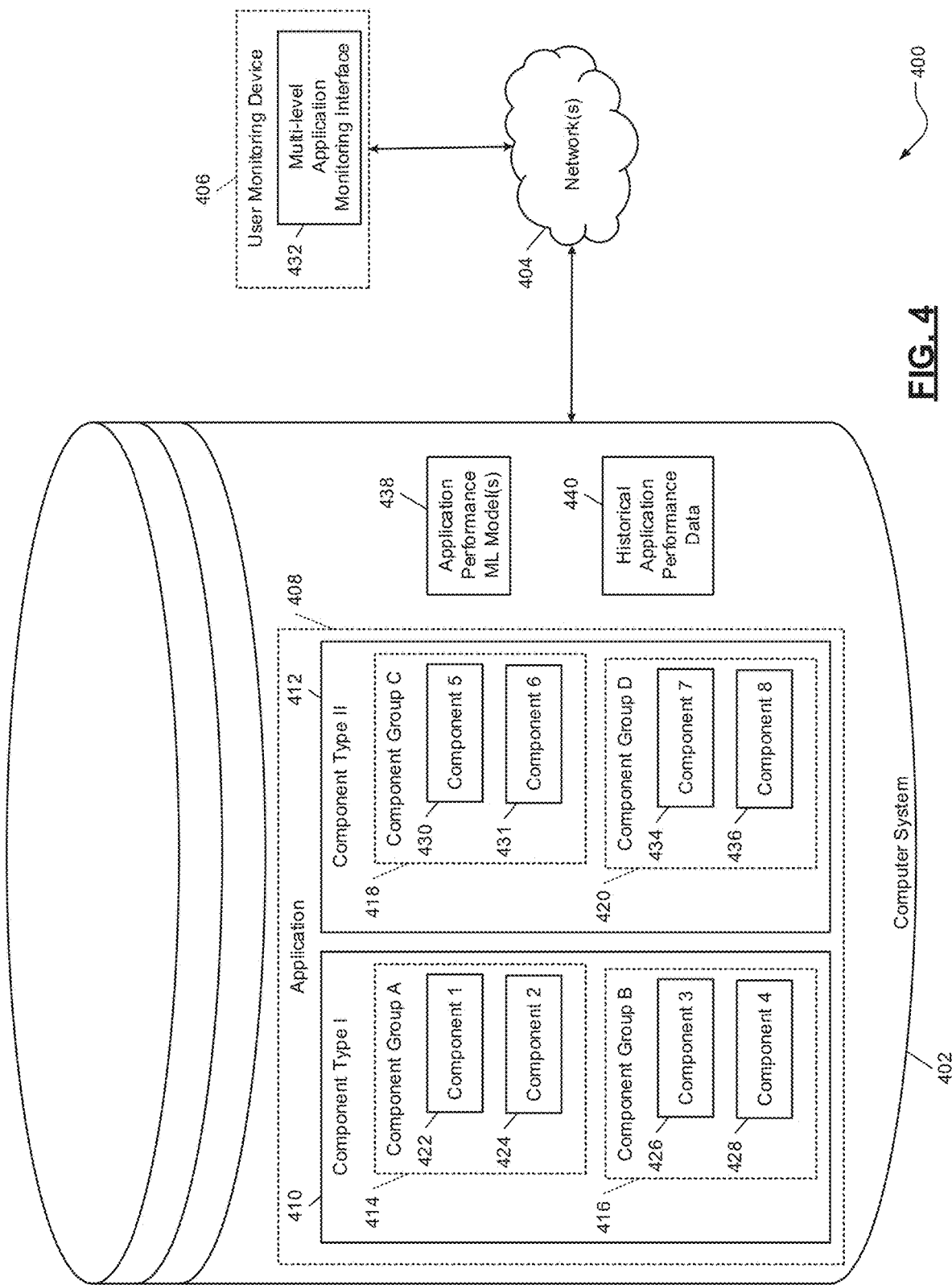
FIG. 4 is a functional block diagram of an example system including machine learning models for automated anomaly detection for computer system components.

FIG. 4 is a block diagram of an example implementation of a system 400 that uses machine learning models for automated anomaly detection for computer system components, including a computer system 402. While the computer system 402 is generally described as being deployed in a computer network system, the computer system 402 may otherwise be deployed (for example, as a standalone computer setup). The computer system 402 may be a desktop computer, a laptop computer, a tablet, a smartphone, etc.

As shown in FIG. 4, the computer system 402 includes an application 408, application performance machine learning model(s) 438, and historical application data 440. The application 408, the application performance machine learning model(s) 438, and the historical application data 440, may be located in different physical memories within the computer system 402, such as different random access memory (RAM), read-only memory (ROM), a non-volatile hard disk or flash memory, etc. In some implementations, one or more of the application 408, the application performance machine learning model(s) 438, and the historical application data 440, may be located in the same memory (such as in different address ranges of the same memory).

The application 408 includes a first component type 410 and a second component type 412. As described further below, the first component type 410 and the second component type 412 may be considered as logical groupings of different types of components that may belong to the application 408. Although FIG. 4 illustrates a single application 408 having a first component type 410 and a second component type 412, various implementations may include more than one application, and may include more or less than two component types within each application.

As shown in FIG. 4, the first component type 410 includes a first component group 414 and a second component group 416. The second component type 412 includes a third component group 418 and a fourth component group 420. Although FIG. 4 illustrates each component type as having two component groups, various implementations may include more or less component groups within each component type.

Each component group may include a logical grouping of components within the component type that are similar to one another. For example, the first component group 414 incudes a first component 422 and a second component 424, the second component group 416 includes a third component 426 and a fourth component 428, the third component group 418 includes a fifth component 430 and a sixth component 431, and the fourth component group 420 includes a seventh component 434 and an eighth component 436. Although FIG. 4 illustrates each component group as having two components, various implementations may include more or less components within each component group.

The system 400 also includes a user monitoring device 406. The user monitoring device includes a multi-level application monitoring interface 432, which may be used to monitor performance anomalies of the components of the computer system 402 as described further below. The user monitoring device 406 may include any suitable device for displaying element tile health statuses and receiving user element selections, such as a desktop computer, a laptop computer, a tablet, a smartphone, etc. The user monitoring device 406 may access the computer system 402 directly, or may access the computer system 402 through one or more networks 404. Example networks may include a wireless network, a local area network (LAN), the Internet, a cellular network, etc.

As mentioned above, the health status and health scores dashboard (such as the multi-level application monitoring interface 432), may provide a four level health monitoring interactive display, to enable eyes-on-glass health monitoring with drill-down into component-level problems in isolation. In the example of FIG. 4, the levels are: Level 1—application health; Level 2—application component type health (such as business transactions, services, and infrastructure component types); Level 3—application component group health (for example, logical groupings of a set of related application components); and Level 4—application component health.

A user may navigate back and forth through the levels by selecting desired tile elements to descend down to a lower level, selecting a back button to return up to a higher level, or clicking on a higher level object on a user interface (such as selecting a parent group icon may displayed at a higher level on the screen where multiple panel levels are displayed at the same time). In this example, there are five panel levels in the dashboard, including an application level panel, a component type panel, a component group panel, a component name panel, and a component details panel.

A health status and health score for each tile element may be read from a precog_summary index at the component level, and then rolled up to tile elements in the three higher levels using logic rules. For example the dashboard may open to display only the first level, application health. If a user selects a tile element for one of the applications, the user may expose more rows on the dashboard to focus on a second level that displays component type tile elements that correspond to the selected application. The user can then click on a component type tile element to descend to a lower level, and so on. Although FIG. 4 illustrates four levels for the multi-level application monitoring interface 432, various implementations may include more or less levels, and components may be grouped in other arrangements.

Figure 5A:
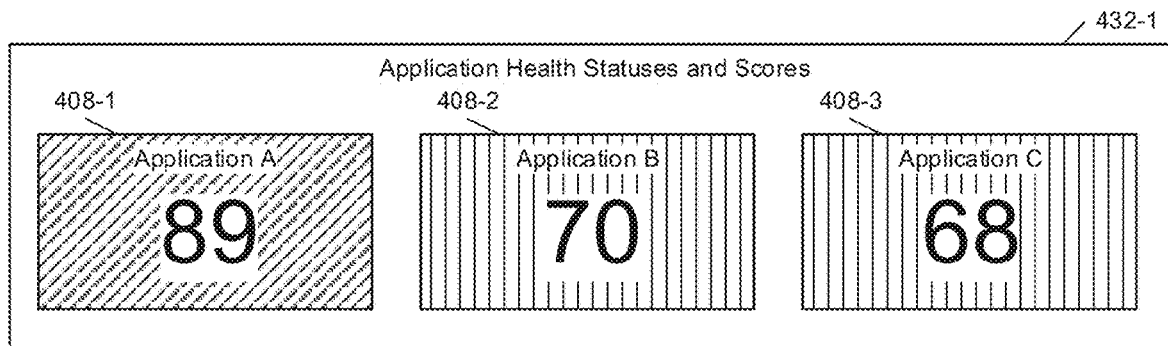
FIGS. 5A-5E are functional block diagrams of example user interfaces for the system of FIG. 4.

FIGS. 5A-5E illustrate example user interfaces for the system of FIG. 4. For example, the interface 432-1 of FIG. 5A may be a top level screen of the multi-level application monitoring interface 432. As shown in FIG. 5A, the first interface 432-1 includes a first application element 408-1, a second application element 408-2, and a third application element 408-3. The different application elements may represent various applications that are running on the computer system 402.

As shown in FIG. 5A, each application element has a status indicator based on a color, shading or cross-hatching of the element. For example, the diagonal cross-hatching of the first application element 408-1 may indicate that at least one component of Application A is currently experiencing a performance anomaly condition, or has recently experienced a performance anomaly condition (such as one of the components of Application A having an outlier response time value indicative that the component may be failing or about to fail).

The vertical cross-hatching of the second application element 408-2 and the third application element 408-3 may indicate that components of the second application element 408-2 and the third application element 408-3 are currently operating normally (for example, the components of the second application element 408-2 and the third application element 408-3 are not currently operating with any outlier response times or other conditions that would indicate a failure or impending failure of the component). In various implementations, any suitable color codes may be used for the application elements, such as green for an application where all underlying components are operating normally, and yellow or orange for an application where at least one component is experiencing a failure condition or an impending failure condition.

As shown in FIG. 5A, each application element also displays a health score for components of its corresponding application, which may be determined as explained further below. The first application element 408-1 has a health score of 89, the second application element 408-2 has a health score of 70, and the third application element 408-3 has a health score of 68. Although FIG. 5A illustrates elements for three applications, various implementations may include more or less applications and corresponding application elements.

A user may select an application element to dive deeper into the components of the application, such as to investigate an underlying component that is experiencing a failure condition. For example, if a user notices that the first application element 408-1 has at least one component experiencing a performance anomaly as detected by a machine learning model, the user may click on the first application element 408-1 to view the health status of the component type groupings that belong to the application associated with the first application element 408-1.

Figure 5B:
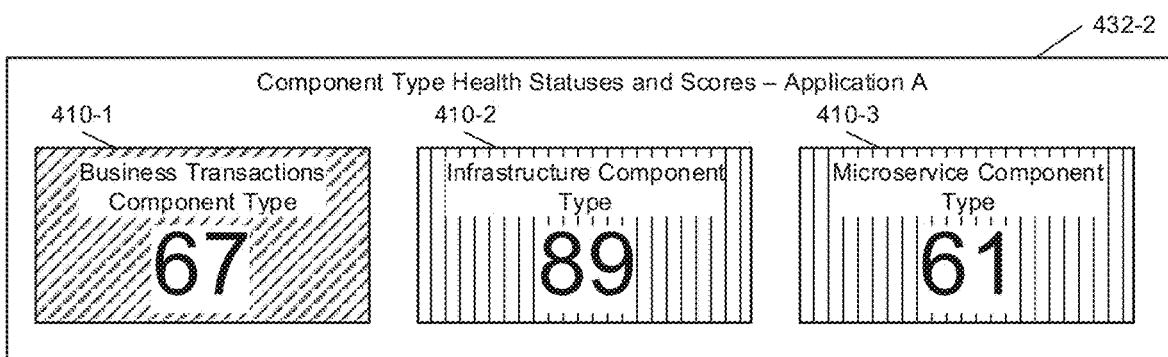

The second interface 432-2 shows health statues and scores for component types that belong to Application A. For example, the first type element 410-1 illustrates a health status and score for components of the computer system 402 that belong to the Business Transactions component type. The second type element 410-2 illustrates a health status and score for components of the computer system 402 that belong to the Infrastructure component type. The third type element 410-3 illustrates a health status and score for components of the computer system 402 that belong to the Microservice component type. Although FIG. 5B illustrates three specific component types, various implementations may include more or less type elements, and other groupings of type elements.

If a user selects the first type element 410-1, corresponding to the Business Transaction component type, in view of the diagonal cross-hatching of the first type element 410-1 (which indicates a detected anomaly in a component of the Business Transaction type), the multi-level application monitoring interface 432 may proceed to display the third interface 432-3. The third interface 432-3 illustrates example component groups that belong to the Business Transaction component type.

Figure 5C:
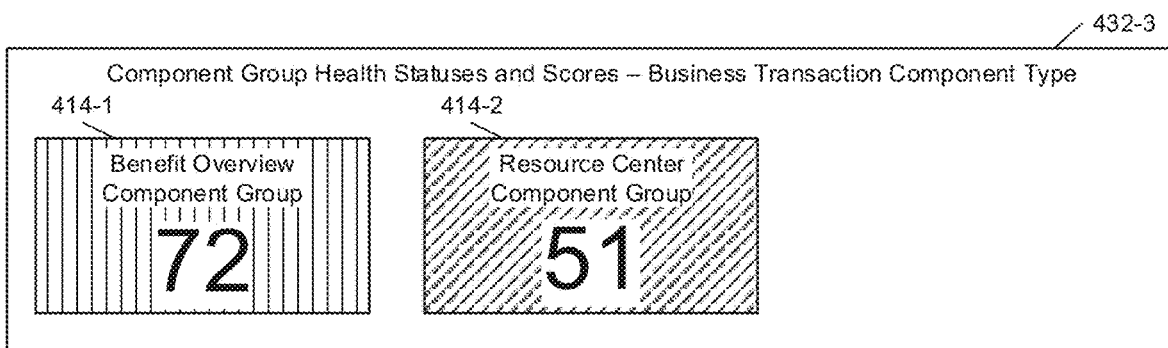

As shown in FIG. 5C, a first group element 414-1 indicates a health status and a health score of components belonging to the Benefit Overview component group, and the second group element 414-2 indicates a health status and a health score of components belonging to the Resource Center component group. Although FIG. 5C illustrates two specific component groups, various implementations may include more or less group elements, and groups may be separated to cover other types of component groupings.

Figures 5D, 5E:
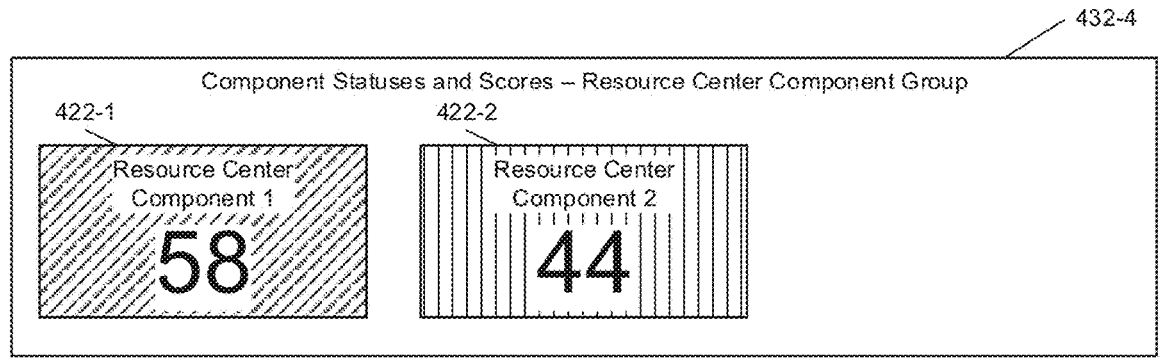

If a user selects the second group element 414-2 corresponding to a resource center group (for example, in view of the warning status of the second group element 414-2), the fourth interface 432-4 is displayed. The fourth interface 432-4 displays health status and score information for components that belong to the resource center group. As shown in FIG. 5D, a first component element 422-1 displays a warning cross-hatching. The second component element 422-2 displays a normal operation cross-hatching. Although FIG. 5D illustrates two component elements, various implementations may include more or less component elements in each component group.

When a user clicks on one of the component elements, a status value table (such as a data structure) is displayed to the user to view operation parameters of the selected component. For example, FIG. 5E illustrates a fifth interface 432-5 including a table that depicts parameter values for the component corresponding to the first component element 422-1 of FIG. 5D.

As shown in FIG. 5E, the table includes data entries for a time that the latest measurement was taken, a name for any detected error, a name of the computer system host where the performance anomaly occurred, a volume of the anomalies that occurred, boundary ranges that may specify when an outlier performance will be determined as an anomaly, a Z-score for the detected anomaly, a probability density volume for the detected anomaly, a response time of the component, boundary ranges for detecting an anomaly according to the response time, a Z-score of the response time, a probability density of the response time, a health status value and a health score value. Although FIG. 5E illustrates specific parameters of the component, various implementations may include more or less (or other) parameters of the component.

Defined boundary ranges may include data set descriptions produced by a DensityFunction machine learning algorithm. The boundary range indicates the range or ranges of anomalous data that were found, based on analysis of the data used to train the machine learning model. The multiplicity of ranges is a function of the shape of the data, which may be described by the algorithm as being a normal, exponential or Gaussian kernel density estimation (KDE).

The Z-score may indicate a number of standard deviations that the measured metric of the component is away from the mean for that metric. A probability density includes a probability, as calculated by the machine learning model, that the sample would appear based on the data set that the model was trained with. The lower the probability, the greater the anomalous behavior and greater the resulting z-score.

The health status dashboard may be a near real-time dashboard that displays a most current indication of health. The dashboard may automatically refresh every update period, such as every five minutes. The dashboard may also allow for viewing historical health statuses or component warnings.

Other example columns illustrated in FIG. 5E include a time (such as the time interval for which data is sampled), an error (such as a name of a metric that contains an anomaly), a host (such as the name of a host that experienced an anomaly), and a volume (such as the total count of events for the latest five minute sample). Example performance metrics may be displayed for each component, such as response time, memory utilization, CPU utilization, etc. Each value may be displayed in any suitable manner, such as a $95^{th}$ percentile of the metric over the last five minutes.

The output for the IsOutlier metric may include a list of labels. For example, a value of 1 may represent an outlier condition, and a value of 0 may represent an inlier condition, as assigned to each data point. Outliers may be detected based on values set for a threshold parameter of the measured performance metric. The IsOutlier results column may be inspected to see how well the outlier detection is performing (for example, how well the DensityFunction algorithm is detecting outlier conditions).

The output for BoundaryRanges column may be boundary ranges of outliers on the density function, which are set according to values of the threshold parameters. Each boundary region may have three values, a boundary opening point, a boundary closing point, and a percentage of the boundary region. A normal density function has left and right boundary regions. Data points to the left of the left boundary closing point, and data points to the right of the right boundary opening point, may be assigned as outliers. Exponential density functions have one boundary region. Data points to the right of the right boundary opening point of the exponential density function may be assigned as outliers.

A Gaussian KDE density function can have one or more boundary regions, depending on the number of peaks and dips within the density function. Data points in these boundary regions are assigned as outliers. In cases of boundary regions on the left or right of peaks and dips, guidelines from the normal density function may apply. As the shape for Gaussian KDE density function can differ from dataset to dataset, there may not be consistent left and right boundary regions.

The ProbabiltyDensity metric may indicate a probability density of the data point, according to the fitted probability density. This output may be provided when a show_density parameter is set to true in the DensityFunction algorithm. As mentioned above, a z-score parameter may be the number of standard deviations by which the value of a raw score is above or below the mean value of what is being observed or measured, a healthStatus parameter may be the status of a component's health based on a five minute sampling of data, and a healthScore parameter may include a score for a component's health based on the five minute sampling of data.

Interactive User Interface

Figure 6:
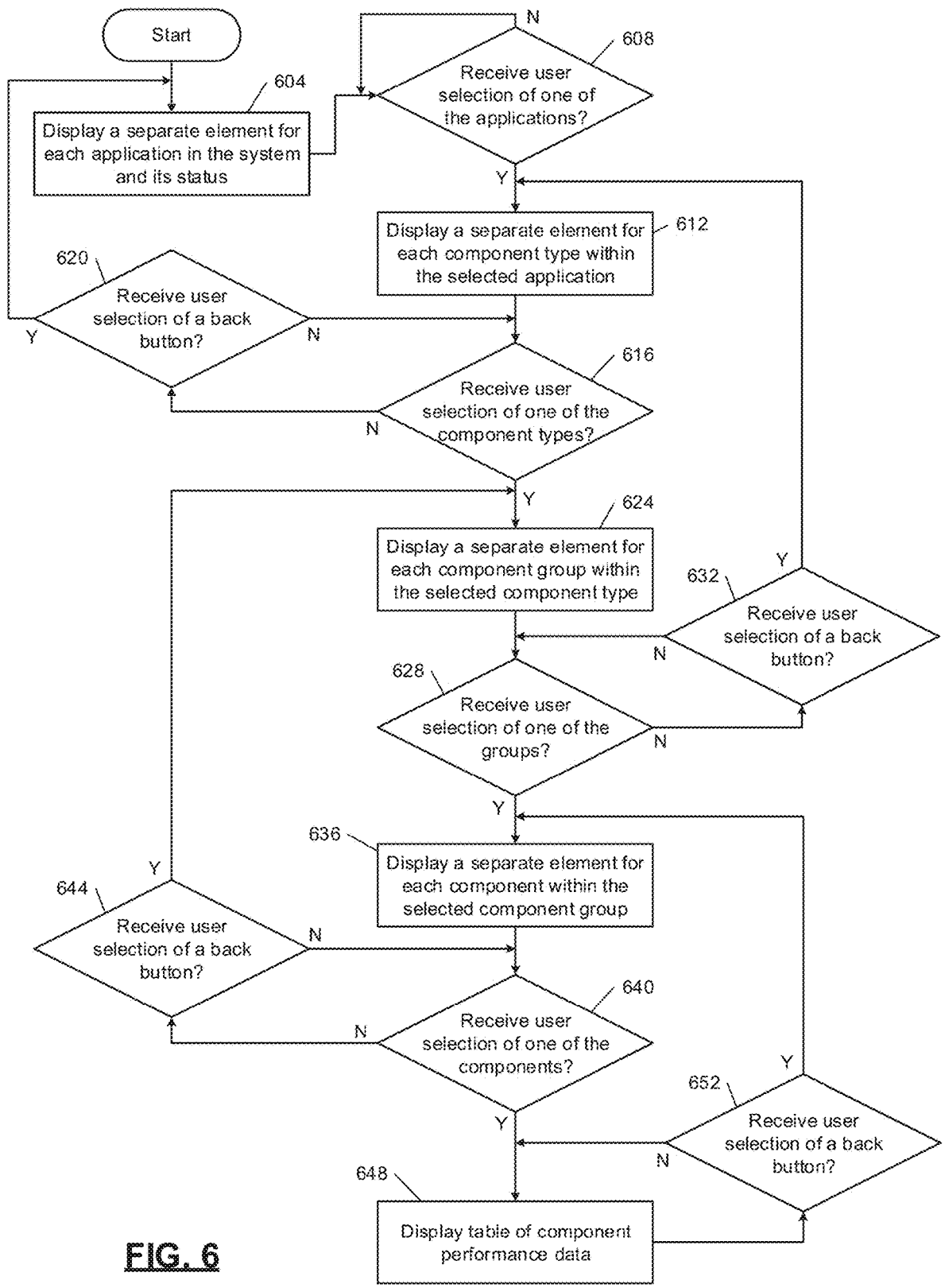
FIG. 6 is a flowchart depicting an example process for managing user navigation of a user interface of the system of FIG. 4.

FIG. 6 illustrates an example process for managing user navigation of a user interface, such as the multi-level application monitoring interface 432 of FIG. 4. At 604, control begins by displaying a separate element for each application in the system, and the status and health score of the element. For example, the graphical icon may have a color indicating the health status as normal or warning, and a numerical score may be displayed on the element.

At 608, control determines whether a user has selected one of the application elements. If not, control waits until a user clicks on one of the application elements. Once control receives a user selection of an application element at 608, control proceeds to 612 to display a separate element for each component type within the selected application.

Control determines at 616 whether a user has selected one of the displayed component types. If not, control proceeds to 620 to determine whether the user has selected a back button (or selected a higher level icon on the screen). If so, control returns to 604 to display separate elements for each application in the system. If the user has not selected the back button at 620, control returns to 616 to determine whether the user has selected one of the displayed component type elements. In this manner, control may wait at the displayed component type screen until a user selects one of the component type elements or selects a back button, in order to move away from the component type screen to a higher or lower level of the interactive interface.

If control determines at 616 that user has selected one of the displayed component type elements, control proceeds to 624 to display separate elements for each component group within the selected component type. Control then determines at 628 whether the user has selected one of the displayed component groups. If not, control proceeds to 632 to determine whether the user has selected the back button. If so, control returns to 612 to display separate elements for each component type within the selected application.

When control determines at 632 that the user has not selected the back button, control returns to 628 to determine whether the user has selected one of the component group elements. If so, control proceeds to 636 to display separate elements for each component within the selected component group. Control then determines at 640 whether the user has selected one of the components. If not, control proceeds to 644 to determine whether the user has selected the back button. If so, control returns to 624 to display separate elements for each component group within the previously selected component type.

If control determines at 644 that the user has not selected the back button, control returns to 640 to determine whether the user selected one of the displayed component elements. If control receives the selection of one of the displayed component elements at 640, control proceeds to display a table of component performance data, such as the table in FIG. 5E, at 648. Control then determines whether the user has selected the back button at 652. If so, control returns to 636 to display separate elements for each component within the previously selected component group. If the user has not clicked the back button at 652, control continues to display the table of component performance data at 648.

Figure 7A:
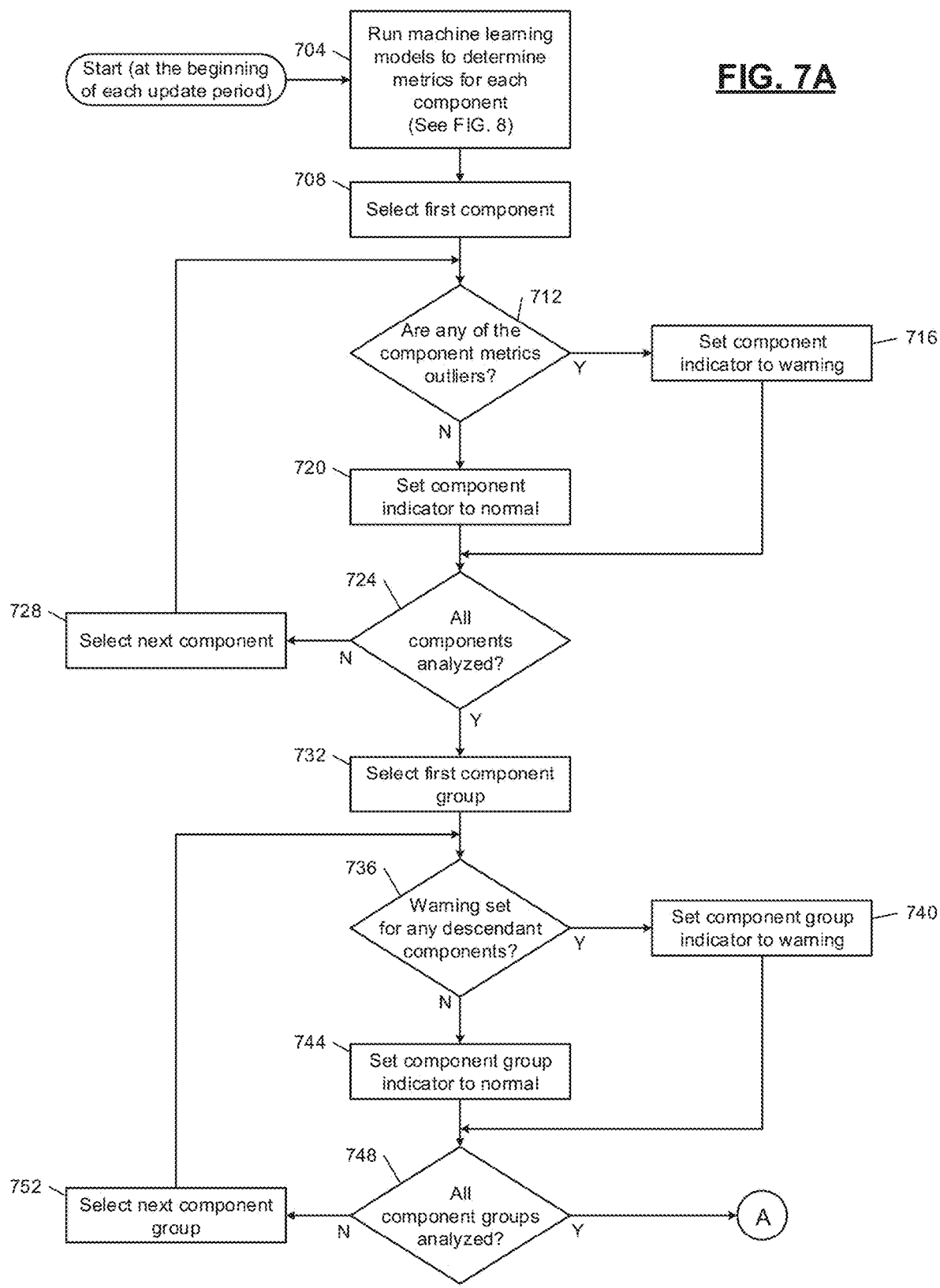
FIGS. 7A and 7B are a flowchart depicting an example process for determining computer system component statuses for display via a user interface of the system of FIG. 4.
Figure 7B:
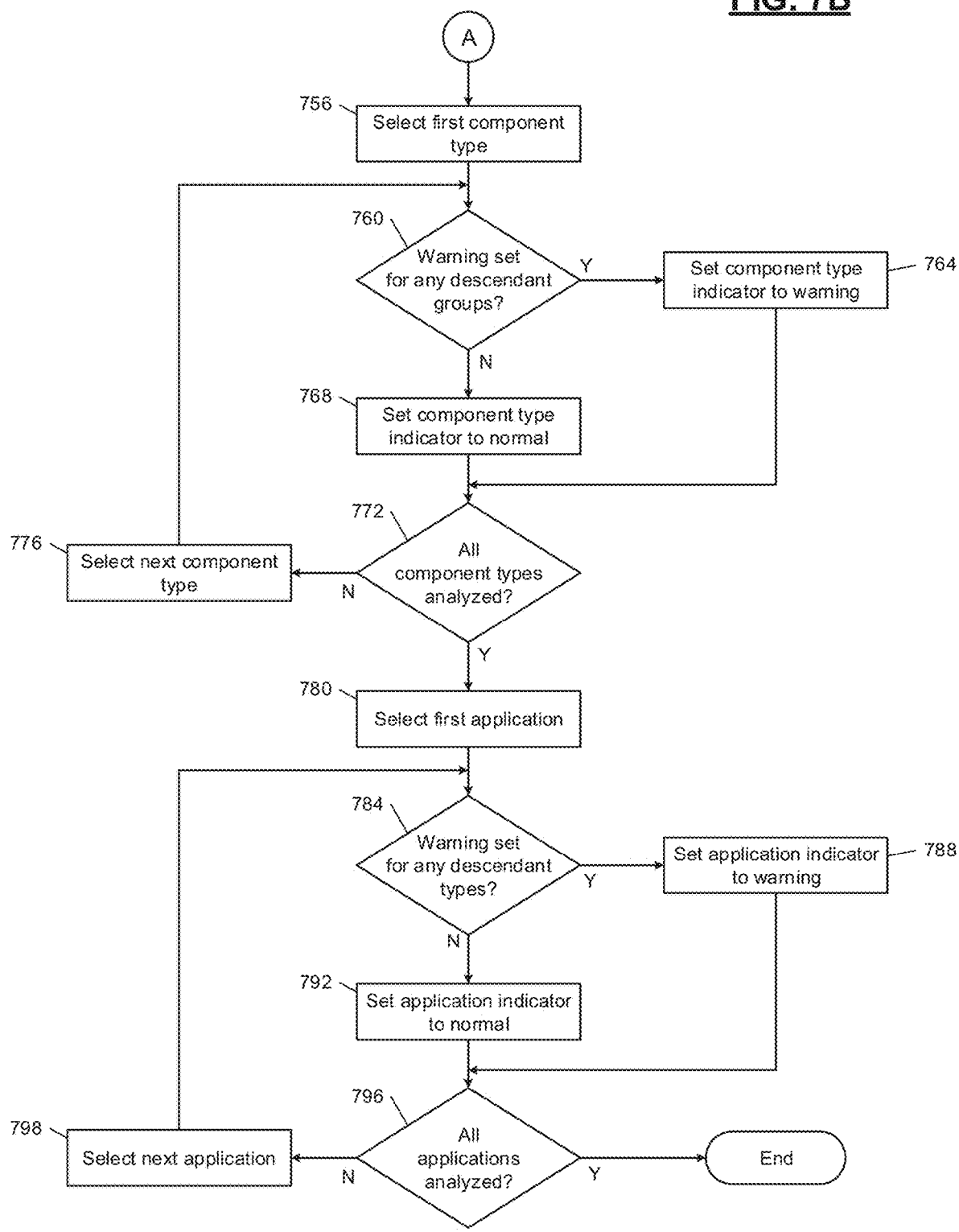

FIGS. 7A and 7B illustrate an example process for determining statuses of application infrastructure components, for display via a user interface (such as the multi-level application monitoring interface 432). As shown in FIG. 7A, control may start at the beginning of each update period, such as a repeating periodic time frame for monitoring performance of each component in the system and applying a machine learning model to determine a health status and score for each component. Example time periods may include every minute, every five minutes, every half-hour, every one hour, etc.

Figure 8:
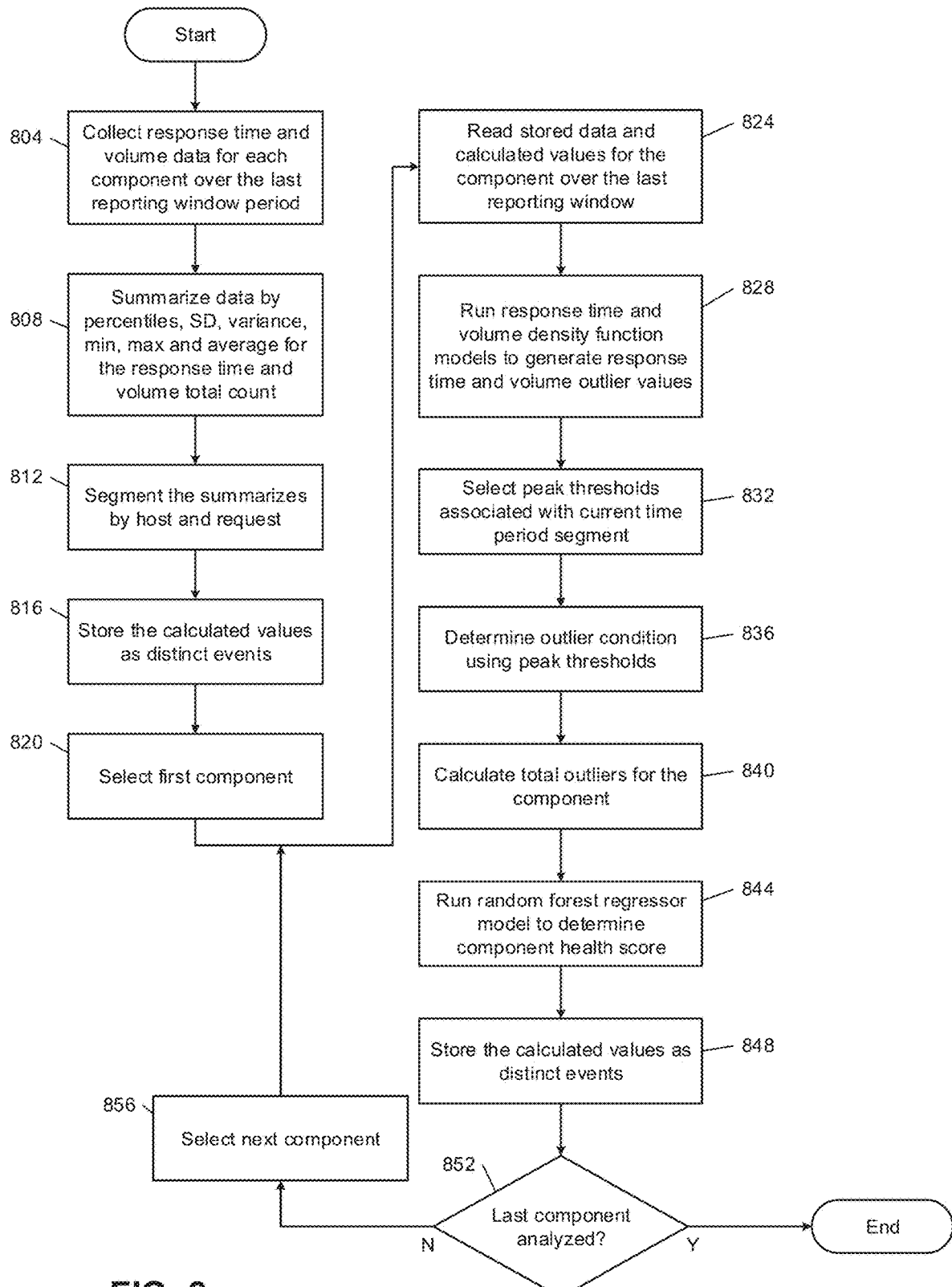
FIG. 8 is a flowchart depicting an example process of running machine learning models to detect anomalies of computer system components.

At 704, control runs one or more machine learning models to determine metrics for each component. For example, different machine learning models may be trained and tailored to specific components to better predict the performance of those components. Additional details of training the machine learning models are illustrated in FIG. 8, and described further below. At 708, control selects a first component of the system. At 712, control determines whether any of the component metrics are outliers. For example, the results of running the machine learning model on the component data may have indicated that the recent performance the component is an outlier condition. If so, control proceeds to 716 to set the component indicator to a warning status.

If control determines at 712 that none of the component metrics are outliers, control proceeds to 720 to set the component indicator to normal. At 724, control determines whether all components of the system have been analyzed. If not, control proceeds to 728 to select the next component and then returns to 712 to determine whether any component metrics of the next selected component are outliers.

Once all components have been analyzed at 724, control proceeds to 732 to select the first component group. At 736, control determines whether a warning has been set for any descendant components of the selected component group. If so, control sets the component group indicator to a warning status at 740. If control determines at 736 that none of the descendant components of the selected component group have warning indicators, control sets the component group indicator to normal at 744.

At 748, control determines whether all component groups have been analyzed. If not, control proceeds to 752 to select the next component group and then returns to 736 to determine whether any warnings have been set for descendant components of the next selected component group. Once all component groups have been analyzed at 748, control proceeds to 756 to select a first component type.

Control determines at 760 whether a warning has been set for any descendant component groups of the selected component type. If so, control proceeds to 764 to set a component type indicator to a warning status. If control determines at 760 that a warning has not been set for any descendant component groups of the selected component type, control sets the component type indicator to normal at 768.

At 772, control determines whether all component types have been analyzed. If not, control proceeds to 776 to select a next component type, and then returns to 760 to determine whether any warnings have been set for descendant component groups of the next selected component type. Once all component types have been analyzed at 772, control proceeds to 780 to select a first application.

At 784, control determines whether warnings have been set for any descendant component types of the application. If so, control sets an application indicator to a warning status at 788. If control determines at 784 that none of the descendant component types of the application have warnings, control proceeds to set the application indicator to normal at 792. Control then determines at 796 whether all applications have been analyzed. If not, control selects the next application at 798 and then returns to 784 to determine whether any descendant component types have a warning set for the next selected application.

FIGS. 7A and 7B illustrate proceeding through each component, component group, component type, and application, in order to determine warning statuses. In various implementations, warning status indicators may only be assigned at the base component level initially, and then higher level warning statues may be calculated on the fly as a user navigates through different levels of the interface.

In various implementations, the component level health status may be indicated as a warning (such as the color yellow or orange), if any of the component metrics are outliers. The component health status may be indicated as unknown (such as the color black), if any of the component metrics are outliers with poor cardinality (which may make them statistically indeterminate). The component health status may be indicated as normal (such as the color green), if none of the component metrics are outliers.

A component group health score may be equal to an average of health scores across all descendant components of the component group. The component group health status may be set to warning if any of the descendant components have a warning status, and may be set to normal otherwise.

A component type health score may be equal to an average health score across all descendant component groups of the component type. The component type health status may be set to warning if any of the descendant component groups have a warning status, and may be set to normal otherwise.

At the application level, an application health score may be equal to an average health score of all descendant component types of the application. An application health status may be set to warning if any of the descendant component types have a warning indicator, and may be set to normal otherwise.

Machine Learning Models for Anomaly Detection

In various implementations, machine learning models may run on the Splunk logging platform, which utilizes the Splunk machine learning toolkit (MLTK). Each machine learning model is designed to generate a value for a given KPI, component and metric. Each of the two KPIs (the health status and the health score), may use a different machine learning algorithm. For example, the health status KPI may utilize a DensityFunction anomaly detection algorithm, and the health score KPI may utilize a RandomForestRegressor numeric prediction algorithm.

In various implementations, 160 or more model instances may be developed utilizing the two machine learning algorithms of DensityFunction and RandomForestRegressor. DensityFunction may be provided by Splunk's machine learning toolkit (MLTK). RandomForestRegressor may be exposed through MLTK, located in the scikit-learn open source library of machine learning algorithms, packaged via the Anaconda main-line Python distribution channel. RandomForestRegressor may be exposed through MLTK, which may act a facade in object-oriented programming to provide an interface between the Splunk processing language and the RandomForestRegressor model of the scikit-learn open source library. The DensityFunction algorithm may be configured to use specific individual thresholds for each component, which may vary for each hour of the day and for each day of the week, resulting in a total of 168 thresholds for each component.

Each machine learning model may be trained nightly on thirty days of historical data (or any other suitable amount of historical data). The models may be trained using five minute summarized data. An ingestion job may be run every five minutes to read raw application and host indexes, and summarize the sampling for storage in a summary index.

The machine learning models may be run every five minutes to sample five minutes of data (or any other suitable running and sampling time periods). The machine learning models are used to generate the health status and health score KPIs for each application component. The generated values are stored in the summary index for fast access by the dashboard. For example, the dashboard may simply search the application component KPI values, and aggregate them based on the structure of the levels of the dashboard panels.

FIG. 8 illustrates an example process of running machine learning models, such as the application performance machine learning models 438, to detect anomalies of application infrastructure components. At 804, control begins by collecting response time and volume data for each component over the last reporting window period. Control then summarizes the data at 808, by percentiles, standard deviation, variance, minimum, maximum, and average, for the determined response time and the volume total count. Although FIG. 8 illustrates some example data parameters that may be summarized, in various implementations more or less (or other) parameters may be monitored for each component.

Control then proceeds to 812 to segment the summaries by host and request. At 816, control stores calculated values as distinct events. Control then proceeds to 820 to select a first one of the components. At 824, control reads stored data and calculates values for the component over the last reporting window. Control then runs response time and volume density function machine learning models to generate response time and volume outlier values, at 828.

At 832, control selects peak thresholds associated with a current time period segment. For example, in various implementations time periods may be segmented throughout the week (such as one time period segment for each hour of the week), and different outlier conditions and peak thresholds may be used for different times during the week.

As an example, each hour of the week may have its own peak thresholds based on historical performance of components during the hour, resulting in 168 different segments and corresponding peak thresholds throughout the week. Therefore, if the current time period is Monday at 10 A.M., current performance of a component may be compared to historical performance of the component at 10 A.M. on Mondays. Similarly, if the current time period is 3 A.M. on a Saturday, current component performance may be compared to historical performance of the component at 3 A.M. on Saturdays.

At 836, control determines whether any outlier conditions exist using the selected peak thresholds. For example, control may compare current performance measurements to historical peak thresholds to determine whether a component is currently performing with an outlier condition indicative of failure or impending failure. At 840, control calculates a total number of outliers for the component.

Control then proceeds to 844 to run a random forest regressor model to determine a health score of the component. Example details for calculating the health score are provided below. At 848, control stores the calculated values as distinct events. Control then determines at 852 whether the last component has been analyzed. If not, control selects the next component at 856, and then returns to 824 to read stored data and calculate values for the next selected component over the last reporting window. If control determines at 852 that the last component has been analyzed, control may end the process, until starting the example method illustrated in FIG. 8 again at the conclusion of the next reporting window period.

As an example calculation of a component health status, if the IsOutlier output variable from the DensityFunction algorithm is equal to one and the cardinality is greater than or equal to fifty, the component health status may be set to warning. If the IsOutlier variable is one and the cardinality is less than fifty, the component health status may be set to unknown. Otherwise, the component health status may be set to normal. The component health score may be a continuous value RFR_Output produced by the RandomForrestRegressor alogrithm. For example, the component health score may be equal to 100*(1−RFR_Output).

In various implementations, example parameters of the DensityFunction model may include a threshold value of 0.0001 (which may be used for both the fit and apply operations), a distribution parameter value of auto (which may be used for the fit operation), and a show_density parameter value of true (which may be used for both the fit and apply operations).

In various implementations, example parameters of the RandomForestRegressor model may include an n_estimators value of 1000 (for example, the number of trees in the forest), a max_depth value of 2 (for example, the maximum depth of a tree with respect to the number of descendant branches from a root), and a max_leaf_nodes value of 40 (for example, a maximum number of leaf nodes with respect to the number of nodes for all branches combined). In various implementations, other suitable parameter values for the DensityFunction and RandomForestRegressor models may be used, and models other than the DensityFunction and RandomForestRegressor models may be used.

Base data for the health status and health score dashboard may include component level data that resides in a precog_summary index. The component level health status and score data may be produced via a three stage data processing pipeline. For example, in a first stage, raw index data may be ingested into a precog_summary index. Next, in a second stage, a machine learning model is trained with thirty days or more of historical data. Machine learning models are then applied in a third stage to recent samples of data (such as every five minutes), in order to predict a health of components. Each processing stage may be implemented as a set of scheduled reports that use the Splunk Processing Language (SPL) to encode the data acquisition and transformation steps.

In various implementations, a stage 1 scheduled report may run every five minutes to read five minutes of raw index data, summarize the five minutes of data, and ingest the summarized data into fields described in the SPL in the precog_summary index. A stage 2 scheduled report may run nightly to read thirty days of summary data from the stage 1 summary index, and train a machine learning model with the read data using the parameters indicated in the read data.

Machine learning models may be trained for the two supported KPIs (component health status and component health score), which may each cover four metrics (volume, response time, memory utilization, and CPU utilization) for three enterprise application environments. In various implementations, more or less (or other) KPIs may be supported, and each KPI may cover more or less (or other) metrics. The machine leaning models may be partitioned into about 160 model instances or more, in order to obtain a desired input cardinality for running with a specified Splunk platform configuration.

In various implementations, a stage 3 scheduled report may run every five minutes to read five minutes of recent summarized data from the stage 1 summary index. The stage 3 scheduled report may apply a machine learning model (for example, as trained in stage 2), to the read data, in order to predict a component health status and determine a health score. The component health status and score are then ingested into the precog_summary index.

As an example process for calculating a health score for a component, data collection and transformation may first be performed according to a scheduled job. For example, every five minutes the system may collect response time and volume data for a named component from the raw index for the last five minutes. The system may then summarize the data by percentiles (such as by $25^{th}$, $50^{th}$, $75^{th}$, $90^{th}$, and $95^{th}$ percentiles), standard deviation, variance, minimum, maximum, average for the response time, and total counts of the volume.

The system may then segment the summaries by host and request (for example, a Java Server Pages (JSP) request), and store calculated values as a distinct event type in the precog_summary index. Example code may utilize a raw index from the application server Broadvision, which supports business transactions for an External eSD application. The code may also perform summarization as it runs, for several hundred business transaction components of an External eSD application.

Density function model training may be performed once per day, or more or less frequently. The model training may include reading component input data from the precog_index for at least thirty days of historical data (or any other suitable time period), and then training a density function anomaly detection algorithm on fields of interest, such as response time and volume.

Example code for training the density function model may utilize a raw index from the application server Broadvision, which supports business transactions for an External eSD application. The code may fit the density function algorithm on a response time metric by splitting the data according to request type, hour of the day, and day of the week.

The random forest regressor model may be trained by reading component health status data for at least thirty days of historical data from the precog_summary index, and then calculating isBusinessHour and isBusinessDay fields from default data fields. A total number of outliers may be calculated using generated outliers from the density function algorithm models, and the random forest regressor algorithm may be trained on all fields to calculate the health score of a component. The outcome generated from the health score model may be converted to a number from 0 to 100, where 100 indicates a healthy component.

FIG. 9 is a table 900 illustrating example anomaly detection values of computer system components, as calculated by machine learning models. For example, FIG. 9 shows timestamps of different events that have been detected and stored. The log of the request address for the component is stored in the table, along with the originating host of the component. Volumes (such as the total number of outliers), and a response time the component, are also stored in the table.

FIG. 9 illustrates example boundary ranges for the volume, which may identify conditions in which the volume is considered to be indicative of failure or impending failure of the component. An IsOutlier column indicates whether an outlier condition exists for the component, and the probability density value indicates a probability calculation measured by the anomaly detection models. FIG. 9 also includes a column for the type of request made by the component.

Figure 10:
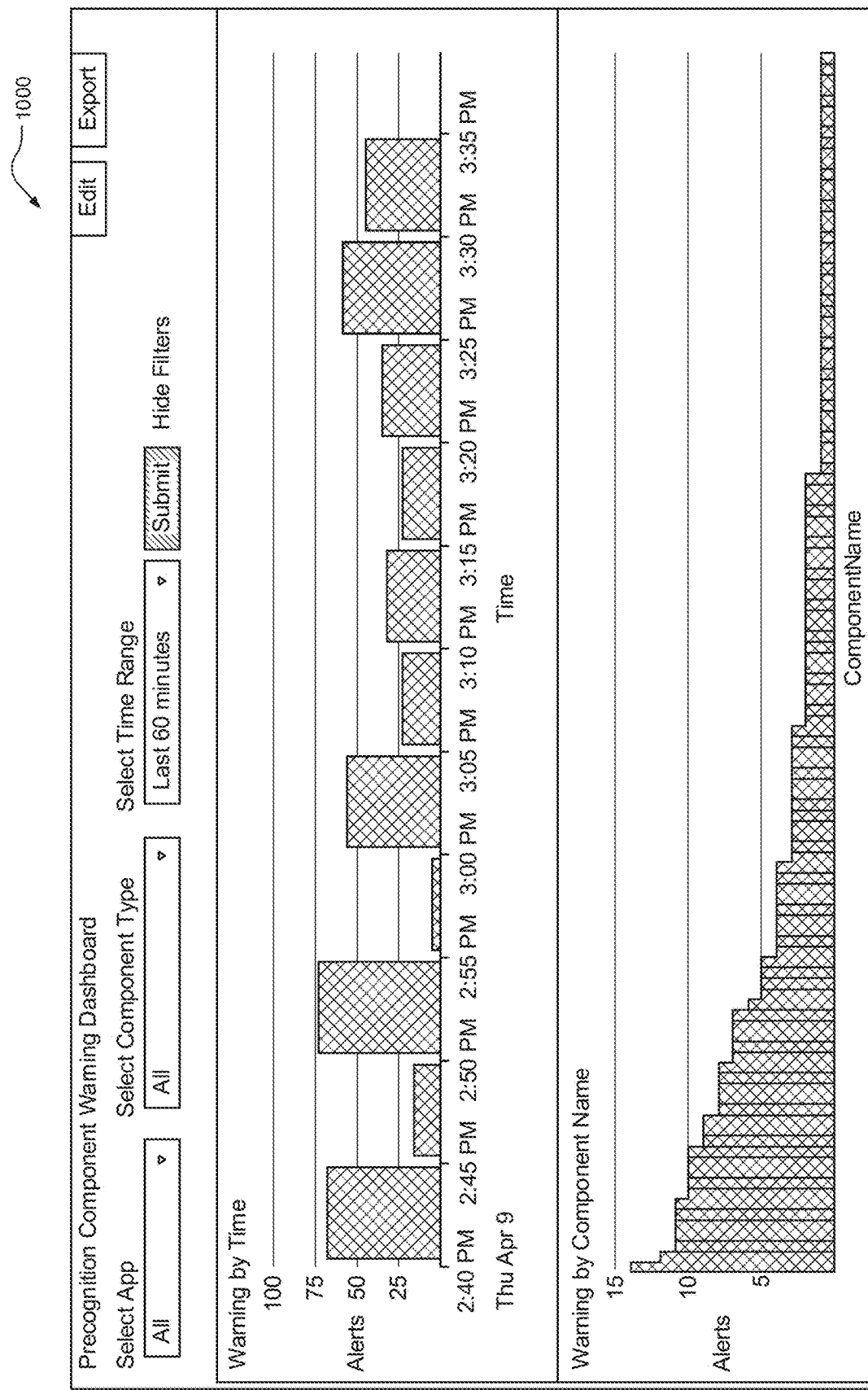
FIG. 10 illustrates an example user interface depicting historical anomaly detection for computer system components.

FIG. 10 illustrates an example user interface 1000 depicting historical anomaly detection events for application infrastructure components. As shown in FIG. 10, historical data may be viewed and filtered by application, component type, and time range, such as the last sixty minutes. In various implementations, more or less (or other) filter types may be included.

The upper graph of the interface 1000 illustrates a number of warning alerts that have occurred by time. The graph is divided into five minute segments, and illustrates the total number of warning alerts that occurred within each five minute segment. The lower graph illustrates warnings by component name, which may allow user to identify which components are creating the most warning alerts, and therefore may receive the most attention.

In various implementations, a historical health status dashboard may allow the user to see all health statuses of components over time. The dashboard may display all component status information that was displayed on the detailed component table of the health status dashboard (such as the table of FIG. 5E). A component warning dashboard may provide a historical view of the warnings generated by the anomaly detection machine learning model. Chart columns may be clickable, in order to open a listing of all warnings and machine learning model details for a component warning during the time period selected.

A noise filter dashboard may be used to visualize and configure a second level anomaly detection filter. The dashboard may be used to aid in tuning a second level filter that is acceptable from a statistical perspective, while still being consumable by a downstream ITSM event management pipeline that consumes alerts and automatically generates incident tickets for handling by an enterprise operations command center.

In various implementations, a first level filter may use a standard threshold value of 0.001. This may be appropriate for variability of diverse application infrastructure behaviors. In some cases, the volume of generated alerts in a 24 hour period may still be too high, and contain too much noise to be sufficiently actionable. A second level filter may utilize a same anomaly detection model with a configurable filter, in order to reduce the event set to a manageable volume and release the most egregious offenders to be addressed by down-stream systems.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase at least one of A, B, and C should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system for automated detection of anomalous performance of application infrastructure components, the computer system comprising:
    memory hardware configured to store a first machine learning model, a second machine learning model, measured historical performance metrics, and computer-executable instructions, wherein the measured historical performance metrics include at least one of a component response time, a component volume, a component memory utilization, and a component processor utilization; and
    processor hardware configured to execute the instructions, wherein the instructions include:
        training the first machine learning model with the measured historical performance metrics to generate a component health status output;
        training the second machine learning model with the measured historical performance metrics to generate a component health score output;
        generating a plurality of elements for display in a multi-level application monitoring interface, wherein each element of the plurality of elements corresponds to one of a plurality of application infrastructure components and includes a status indicator;
        obtaining measured performance metrics of a first component of the plurality of application infrastructure components during a reporting window time period;
        identifying a time period segment associated with the reporting window time period;
        obtaining an outlier threshold value corresponding to the identified time period segment;
        processing the measured performance metrics with the first machine learning model, using the obtained outlier threshold value, to produce the component health status output for the first component;
        in response to the component health status output for the first component being a normal status indicative of normal operation of the first component, setting the status indicator of the element corresponding to the first component to a normal value;
        in response to the component health status output for the first component being an abnormal status indicative of abnormal operation of the first component, modifying the status indicator of the element corresponding to the first component to a warning value;
        processing the measured performance metrics with the second machine learning model, using the obtained outlier threshold value, to produce the component health score output for the first component; and
        generating an output to transform a display visible to an operator, wherein the output incorporates the component health score output and the status indicator for the first component on the element corresponding to the first component, wherein:
    the multi-level application monitoring interface includes four display panel levels;
    the plurality of elements includes a plurality of application elements, a plurality of component type elements, a plurality of component group elements, and a plurality of component elements;
    a first one of the four display panel levels includes the plurality of application elements, and each one of the plurality of application elements corresponds to a different application;
    a second one of the four display panel levels includes the plurality of component type elements, and each one of the plurality of component type elements corresponds to a different component type;
    a third one of the four display panel levels includes the plurality of component group elements, and each one of the plurality of component group elements corresponds to a different component group; and
    a fourth one of the four display panel levels includes the plurality of component elements, and each one of the plurality of component elements corresponds to a different one of the plurality of application infrastructure components.

2. The computer system of claim 1 wherein the instructions further include, in response to the component health status output for the first component being the abnormal status, automatically modifying the abnormal operation of the first component.

3. The computer system of claim 1 wherein the instructions further include, in response to the component health status output for the first component being the abnormal status, automatically generating a ticket request to modify the abnormal operation of the first component.

4. The computer system of claim 1 wherein the transforming the display includes displaying the first one of the display panel levels, and the instructions further include:
    displaying the second display panel level in response to receiving a user selection of one of the plurality of application elements, wherein each of the plurality of component type elements displayed on the second display panel level are descendant component type elements of the selected application element;
    displaying the third display panel level in response to receiving a user selection of one of the displayed plurality of component type elements, wherein each of the plurality of component group elements displayed on the third display panel level are descendant component group elements of the selected component type element;
    displaying the fourth display panel level in response to receiving a user selection of one of the displayed plurality of component group elements, wherein each of the plurality of component elements displayed on the fourth display panel level are descendant component elements of the selected component group element; and
    displaying a component data structure in response to receiving a user selection of one of the displayed plurality of component elements, wherein the component data structure includes measured performance metrics of the selected component element.

5. The computer system of claim 4 wherein the instructions further include:
    for each component group element, calculating an average of component health score outputs for each descendant component element of the component group element and displaying the calculated average in the component group element;

for each component type element, calculating an average of component health score outputs for each descendant component group element of the component type element and displaying the calculated average in the component type element; and for each application element, calculating an average of component health score outputs for each descendant component type element of the application element and displaying the calculated average in the application element.

6. The computer system of claim 4 wherein the instructions further include:

for each component group element, in response to any descendant component element of the component group element having a warning status indicator, setting a status indicator of the component group element to the warning value;

for each component type element, in response to any descendant component group element of the component type element having a warning status indicator, setting a status indicator of the component type element to the warning value; and for each application element, in response to any descendant component type element of the application element having a warning status indicator, setting a status indicator of the application element to the warning value.

7. The computer system of claim 1 wherein:

the first machine learning model comprises a density function machine learning model; and the second machine learning model comprises a random forest regressor machine learning model.

8. The computer system of claim 1 wherein the instructions further include, after the obtaining measured performance metrics, summarizing the measured performance metrics to generate a plurality of percentiles of the measured performance metrics, a standard deviation of the measured performance metrics, a variance of the measured performance metrics, a minimum of the measured performance metrics, a maximum of the measured performance metrics, an average of the measured performance metrics, a response time of the measured performance metrics, and a volume of the measured performance metrics.

9. The computer system of claim 1 wherein the instructions further include displaying a historical event dashboard on the multi-level application monitoring interface, wherein the historical event dashboard displays warning values generated for the plurality of application infrastructure components during a specified historical time period, and the displayed warning values are sorted by at least one of a time that each warning value was generated and a component that generated each warning value.

10. A computerized method for automated detection of anomalous performance of application infrastructure components, the method comprising:

training a first machine learning model with measured historical performance metrics to generate a component health status output, wherein the measured historical performance metrics include at least one of a component response time, a component volume, a component memory utilization, and a component processor utilization;

training a second machine learning model with the measured historical performance metrics to generate a component health score output;

generating a plurality of elements for display in a multi-level application monitoring interface, wherein each element of the plurality of elements corresponds to one of a plurality of application infrastructure components and includes a status indicator;

obtaining measured performance metrics of a first component of the plurality of application infrastructure components during a reporting window time period;

identifying a time period segment associated with the reporting window time period;

obtaining an outlier threshold value corresponding to the identified time period segment;

processing the measured performance metrics with the first machine learning model, using the obtained outlier threshold value, to produce the component health status output for the first component;

in response to the component health status output for the first component being a normal status indicative of normal operation of the first component, setting the status indicator of the element corresponding to the first component to a normal value;

in response to the component health status output for the first component being an abnormal status indicative of abnormal operation of the first component, modifying the status indicator of the element corresponding to the first component to a warning value;

processing the measured performance metrics with the second machine learning model, using the obtained outlier threshold value, to produce the component health score output for the first component; and generating an output to transform a display visible to an operator, wherein;

the output incorporates the component health score output and the status indicator for the first component on the element corresponding to the first component, the multi-level application monitoring interface includes four display panel levels, the plurality of elements includes a plurality of application elements, a plurality of component type elements, a plurality of component group elements, and a plurality of component elements, a first one of the four display panel levels includes the plurality of application elements, and each one of the plurality of application elements corresponds to a different application, a second one of the four display panel levels includes the plurality of component type elements, and each one of the plurality of component type elements corresponds to a different component type, a third one of the four display panel levels includes the plurality of component group elements, and each one of the plurality of component group elements corresponds to a different component group, and a fourth one of the four display panel levels includes the plurality of component elements, and each one of the plurality of component elements corresponds to a different one of the plurality of application infrastructure components.

11. The method of claim 10 further comprising, in response to the component health status output for the first component being the abnormal status, automatically modifying the abnormal operation of the first component.

12. The method of claim 10 further comprising, in response to the component health status output for the first component being the abnormal status, automatically generating a ticket request to modify the abnormal operation of the first component.

13. The method of claim 10 wherein the transforming the display includes displaying the first one of the display panel levels, the method further comprising:
displaying the second display panel level in response to receiving a user selection of one of the plurality of application elements, wherein each of the plurality of component type elements displayed on the second display panel level are descendant component type elements of the selected application element;
displaying the third display panel level in response to receiving a user selection of one of the displayed plurality of component type elements, wherein each of the plurality of component group elements displayed on the third display panel level are descendant component group elements of the selected component type element;
displaying the fourth display panel level in response to receiving a user selection of one of the displayed plurality of component group elements, wherein each of the plurality of component elements displayed on the fourth display panel level are descendant component elements of the selected component group element; and
displaying a component data structure in response to receiving a user selection of one of the displayed plurality of component elements, wherein the component data structure includes measured performance metrics of the selected component element.

14. The method of claim 13 further comprising:
for each component group element, calculating an average of component health score outputs for each descendant component element of the component group element and displaying the calculated average in the component group element;
for each component type element, calculating an average of component health score outputs for each descendant component group element of the component type element and displaying the calculated average in the component type element; and
for each application element, calculating an average of component health score outputs for each descendant component type element of the application element and displaying the calculated average in the application element.

15. The method of claim 13 further comprising:
for each component group element, in response to any descendant component element of the component group element having a warning status indicator, setting a status indicator of the component group element to the warning value;
for each component type element, in response to any descendant component group element of the component type element having a warning status indicator, setting a status indicator of the component type element to the warning value; and
for each application element, in response to any descendant component type element of the application element having a warning status indicator, setting a status indicator of the application element to the warning value.

16. The method of claim 10 wherein:
the first machine learning model comprises a density function machine learning model; and
the second machine learning model comprises a random forest regressor machine learning model.

17. The method of claim 10 further comprising, after the obtaining measured performance metrics, summarizing the measured performance metrics to generate a plurality of percentiles of the measured performance metrics, a standard deviation of the measured performance metrics, a variance of the measured performance metrics, a minimum of the measured performance metrics, a maximum of the measured performance metrics, an average of the measured performance metrics, a response time of the measured performance metrics, and a volume of the measured performance metrics.

18. The method of claim 10 further comprising displaying a historical event dashboard on the multi-level application monitoring interface, wherein the historical event dashboard displays warning values generated for the plurality of application infrastructure components during a specified historical time period, and the displayed warning values are sorted by at least one of a time that each warning value was generated and a component that generated each warning value.

* * * * *